(12) United States Patent
Tokushima (10) Patent No.: US 8,355,614 B2
(45) Date of Patent: Jan. 15, 2013

(54) OPTICAL WAVEGUIDE

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 12/919,451

(22) PCT Filed: Jan. 26, 2009

(86) PCT No.: PCT/JP2009/051159
§ 371 (c)(1),
(2), (4) Date: Aug. 25, 2010

(87) PCT Pub. No.: WO2009/107427
PCT Pub. Date: Sep. 3, 2009

(65) Prior Publication Data
US 2011/0008009 A1    Jan. 13, 2011

(30) Foreign Application Priority Data

Feb. 28, 2008  (JP) .................. 2008-048273

(51) Int. Cl.
*G02B 6/032* (2006.01)
*G02B 6/34* (2006.01)
*G02B 6/10* (2006.01)
(52) U.S. Cl. ............... 385/125; 385/37; 385/129
(58) Field of Classification Search .............. None
See application file for complete search history.

(56) References Cited

U.S. PATENT DOCUMENTS

| | | | |
|---|---|---|---|
| 6,542,654 B1 | 4/2003 | Miller et al. | |
| 6,542,682 B2 * | 4/2003 | Cotteverte et al. | 385/125 |
| 6,560,006 B2 * | 5/2003 | Sigalas et al. | 359/321 |
| 6,728,457 B2 * | 4/2004 | Sigalas et al. | 385/125 |
| 6,738,551 B2 * | 5/2004 | Noda et al. | 385/130 |
| 6,853,791 B2 * | 2/2005 | Sigalas | 385/129 |
| 6,931,191 B2 * | 8/2005 | Kitagawa et al. | 385/129 |
| 6,937,781 B2 * | 8/2005 | Shirane et al. | 385/16 |
| 6,940,637 B2 * | 9/2005 | Toney | 359/321 |
| 6,993,234 B1 * | 1/2006 | Sigalas et al. | 385/129 |
| 7,027,701 B2 * | 4/2006 | Parker et al. | 385/129 |
| 7,072,547 B2 * | 7/2006 | Assefa et al. | 385/39 |
| 7,162,132 B2 * | 1/2007 | Parker et al. | 385/129 |

(Continued)

FOREIGN PATENT DOCUMENTS

JP    11-218627 A    8/1999

(Continued)

OTHER PUBLICATIONS

International Search Report for PCT/JP2009/051159 mailed Feb. 24, 2009.

(Continued)

*Primary Examiner* — Rhonda Peace (57) ABSTRACT

In an exemplary embodiment, an optical waveguide (10) includes a first dielectric medium (11). In the first dielectric medium (11), line-defect rods (12) are arranged in one row and non-line-defect rods (13) are arranged along the row of line-defect rods (12) and on both sides of the row of the line-defect rods (12). The line-defect rods (12) and non-line-defect rods (13) form a two-dimensional square lattice. Of the rows of non-line-defect rods (13) arranged on the two sides of the row of line-defect rods (12), the number of rows of non-line-defect rods (13) on at least one side is at least one and no greater than five.

14 Claims, 7 Drawing Sheets

U.S. PATENT DOCUMENTS

| | | | |
|---|---|---|---|
| 7,215,861 B2 * | 5/2007 | Sakai et al. | 385/129 |
| 7,242,837 B2 * | 7/2007 | Talneau et al. | 385/129 |
| 7,369,734 B2 * | 5/2008 | Sakai et al. | 385/129 |
| 8,027,556 B2 * | 9/2011 | Tokushima | 385/39 |
| 2002/0048422 A1 * | 4/2002 | Cotteverte et al. | 385/4 |
| 2003/0011775 A1 * | 1/2003 | Soljacic et al. | 356/450 |
| 2003/0174993 A1 * | 9/2003 | Tomaru | 385/129 |
| 2004/0008962 A1 * | 1/2004 | Sigalas et al. | 385/129 |
| 2004/0264903 A1 * | 12/2004 | Dridi et al. | 385/129 |
| 2005/0047742 A1 * | 3/2005 | Kitagawa et al. | 385/129 |
| 2005/0265660 A1 * | 12/2005 | Miller | 385/43 |
| 2006/0104586 A1 * | 5/2006 | Tokushima | 385/129 |
| 2006/0110116 A1 * | 5/2006 | Sakai et al. | 385/129 |
| 2007/0160336 A1 * | 7/2007 | Sakai et al. | 385/129 |
| 2010/0014821 A1 * | 1/2010 | Tokushima | 385/129 |
| 2010/0226609 A1 * | 9/2010 | Tokushima | 385/50 |
| 2010/0278487 A1 * | 11/2010 | Tokushima | 385/43 |
| 2011/0008009 A1 * | 1/2011 | Tokushima | 385/129 |
| 2011/0293217 A1 * | 12/2011 | Tokushima | 385/14 |

FOREIGN PATENT DOCUMENTS

| | | |
|---|---|---|
| JP | 2002228868 A | 8/2002 |
| JP | 2005010758 A | 1/2005 |
| JP | 2005091925 A | 4/2005 |
| JP | 2005274329 A | 10/2005 |
| JP | 2005274844 A | 10/2005 |
| JP | 2005274927 A | 10/2005 |
| JP | 2007047604 A | 2/2007 |
| JP | 2008040230 A | 2/2008 |
| WO | 03107051 A | 12/2003 |

OTHER PUBLICATIONS

S. Assefa et al., "Guiding 1.5 μm light in photonic crystals based on dielectric rods", Applied Physics Letters, vol. 85, No. 25, Dec. 20, 2004, pp. 6110-6112.

* cited by examiner

OPTICAL WAVEGUIDE

This application is the National Phase of PCT/JP2009/051159, filed Jan. 26, 2009, which claims priority based on JP2008-48273A for which application was submitted on Feb. 28, 2008 and by reference incorporates all of the disclosures of that application.

TECHNICAL FIELD

The present invention relates to an optical waveguide, and more particularly to an optical waveguide that uses a photonic crystal.

BACKGROUND

In recent years a technology has been sought for realizing optical integrated circuits in which optical components are integrated, similar to integrated circuits in which electronic components are integrated. Optical circuits are currently assembled by connecting optical components such as optical switches, wavelength filters, and 3-dB couplers (optical couplers) by means of an optical waveguide such as optical fiber. If a plurality of optical components are integrated in a small chip, the volume, power consumption, and fabrication costs of the optical circuit are dramatically reduced.

Various types of techniques aimed at realizing optical integrated circuits have been proposed, one being a technique that uses photonic crystal. In the present specification, the term "photonic crystal" is used as a general term for a structure having a periodic refractive index distribution.

A photonic crystal has various special optical characteristics arising from the periodic structure of refractive index distribution. The most representative characteristic is the existence of a photonic band gap (PBG).

Normally, light is propagated through a crystal. In a photonic crystal having a periodic refractive index distribution, however, the phenomenon occurs that light which belongs to a particular specific frequency band cannot be propagated. Frequency band (or wavelength band) of light that can be propagated in a photonic crystal is called the photonic band. A plurality of photonic bands normally exists. The frequency of light that cannot be propagated in a photonic crystal are called photonic bands gap (PBGs) since they are the gaps existing between photonic bands.

When a defect that slightly breaks the periodicity of a refractive index distribution is present in a photonic crystal having a PBG, light of the frequency band of the PBG is trapped in the vicinity of this defect. As a result, in a photonic crystal in which a defect is arranged in a line, light of the PBG frequency band is guided along the defect that is arranged in a line. Accordingly, this photonic crystal can be used as an optical waveguide.

In the present specification, being part of the dielectric that is arranged in a lattice form in a photonic crystal, the dielectric that is arranged in a line and that corresponds to a lattice defect that disrupts the periodic structure of the refractive index is called a line-defect. In addition, being part of the dielectric arranged in a lattice form, the dielectric other than line defects is called non-line defect. An optical waveguide composed of the above-described photonic crystal is called a line-defect waveguide.

The guiding state of light in a photonic crystal is specified by the set (f, k) of frequency f and wave number k. Normally, light having electromagnetic field distribution that has identical symmetry or identical characteristics forms a band composed of continuous frequency and continuous wave number. This continuous band is called a "mode."

The mode of guided light that is guided along a line defect while being confined to the vicinity of a line defect is called the "guiding mode (or waveguide mode)." The mode of light that is propagated in a medium that is separate from a line defect has similar characteristics to the mode of light that is propagated in a photonic crystal lacking line defects and is called "bulk mode."

To use photonic crystal as an optical waveguide that guides light in three mutually perpendicular directions, a photonic crystal that has a structure in which the refractive index distribution is periodic in three dimensions must be used. However, a photonic crystal of a three-dimensional periodic structure has a complex structure and is extremely expensive to fabricate.

A photonic crystal having a structure in which the refractive index distribution is periodic in two dimensions (hereinbelow referred to as "two-dimensional photonic crystal") is often used. The two-dimensional photonic crystal has a PBG with respect to light that propagates in a two-dimensional plane in which the refractive index is periodic. Accordingly, the presence of a line defect arranged in a line in this two-dimensional plane results in an optical waveguide in which light is guided along the line defect.

In a two-dimensional photonic crystal, the refractive index is not periodic in the direction perpendicular to the two-dimensional plane in which the refractive index is periodic (hereinbelow referred to as the "direction of thickness"). In this case, the total reflection caused by the difference in refractive index between the medium that makes up the photonic crystal and the surrounding medium is used to confine light that propagates in the direction of thickness.

An optical waveguide that uses the above-described two-dimensional photonic crystal is disclosed in Non-Patent Document 1 and Patent Document 1.

The optical waveguide disclosed in Non-Patent Document 1 is composed of photonic crystal in which rod-shaped dielectrics are arranged in a square lattice. This photonic crystal has 13 rows of dielectric rods. The diameter of the dielectric (line defect) of the center row (seventh from the end) is smaller than the diameter of the dielectric of the other rows.

In the following explanation, the dielectric rods that correspond to the line defect are referred to as "line-defect rods." In addition, the dielectric rods other than the line-defect rods are called "non-line-defect rods."

As with an optical fiber that functions as an optical waveguide because it has core and cladding, an optical waveguide composed of photonic crystal functions as an optical waveguide due to the existence of line-defect rods and the non-line-defect rods provided around the line-defect rods (and dielectric medium).

In an optical waveguide made up from a photonic crystal, it is generally believed that as many rows of non-line-defect rods as possible should be arranged on both sides of the line-defect rods. This is because such a configuration ensures a margin in the degree of attenuation to a negligible level of the electromagnetic field distribution of light that is confined in the vicinity of line-defect rods. Leakage of light from the optical waveguide can thus be prevented.

The schematic view shown in Non-Patent Document 1 shows non-line-defect defect rods arranged in two rows on each of the two sides of the line-defect rods that are arranged in one row. Only a few rows of non-line-defect rods are shown for the sake of simplifying the figure. In a microscope photograph shown in the non-patent document, the rows of non-line-defect rods are arranged in six rows on each of the two sides of the row of line-defect rods. Thus, in optical waveguides of the background art that include Non-Patent Document 1, at least six rows of non-line-defect rods are arranged on each of the two sides of the line-defect rods.

The optical waveguides described in Non-Patent Document 1 and Patent Document 1 have somewhat imperfect structures. These imperfect structures indicate non-uniformity of the refractive index of the dielectric medium that makes up the optical waveguide, non-uniformity in the height and profile shape of the line-defect rods and non-line-defect rods, or roughness of the interfaces of the line-defect rods and non-line-defect defect rods.

In an ideal optical waveguide that does not have the above-described imperfect structure, waveguide mode and bulk mode are independent modes to each other. If imperfect structure exists, however, the imperfect structure causes light that is guided along line-defect rods to scatter, whereby the waveguide mode and bulk mode are coupled. As a result, light that is guided as the waveguide mode leaks to the bulk mode.

Light that leaks to the bulk mode may again leak to the guiding mode at other locations of the optical waveguide. In this case, light that has propagated through a plurality of different paths causes interference, whereby the transmission characteristic of the optical waveguide is decreased and noise increases.

Accordingly, guidable light is only light that belongs to the guiding mode that does not intersect with the bulk mode (in dispersion relation), and the problem therefore arises that the frequency band of guidable light is narrowed. It is therefore desired that the frequency band of guidable light be broadened.

Non-Patent Document 1: S. Assefa et. al, "Guiding 1.5 μm light in photonic crystals based on dielectric rods," Applied Physics Letters, Vol. 85, No. 25, pp. 6110-6112, December 2004.

Patent Document 1: JP2005-091925A

SUMMARY OF THE INVENTION

It is an object of the present invention to provide an optical waveguide that can solve any of the above-described problems.

The first optical waveguide of the present invention includes: a first dielectric medium, line-defect rods arranged in one row in the first dielectric medium, and rows of non-line-defect rods arranged along the row of line-defect rods on both sides of the row of line-defect rods. A two-dimensional lattice is formed by the line-defect rods and non-line-defect rods. Further, of the non-line-defect rods arranged on the two sides of the row of line-defect rods, the number of rows of non-line-defect rods on at least one side is at least one but no more than five.

The above and other objects, characteristic, and advantages of the present invention will become clear from the following description of the present invention given by way of example and with reference to the accompanying figures.

REFERENCE SIGNS LIST 10 optical waveguide
11 first dielectric medium
12 line-defect rods
13 non-line-defect rods
14 second dielectric medium
40 continuous region
100 upper limit of the waveguide mode
101 lower limit of the waveguide mode
102 upper limit of the PBG
103 lower limit of the PBG
104 intersecting state
GW Gap Width
11 spacing between the second dielectric medium and non-line-defect rods 13 nearest to the second dielectric medium
12 spacing between the row of line-defect rods and the row of non-line-defect rods nearest to the row of line-defect rods Description Of Embodiments Exemplary embodiments of the present invention are next described with reference to the accompanying figures.

First Exemplary Embodiment

Figure 1:
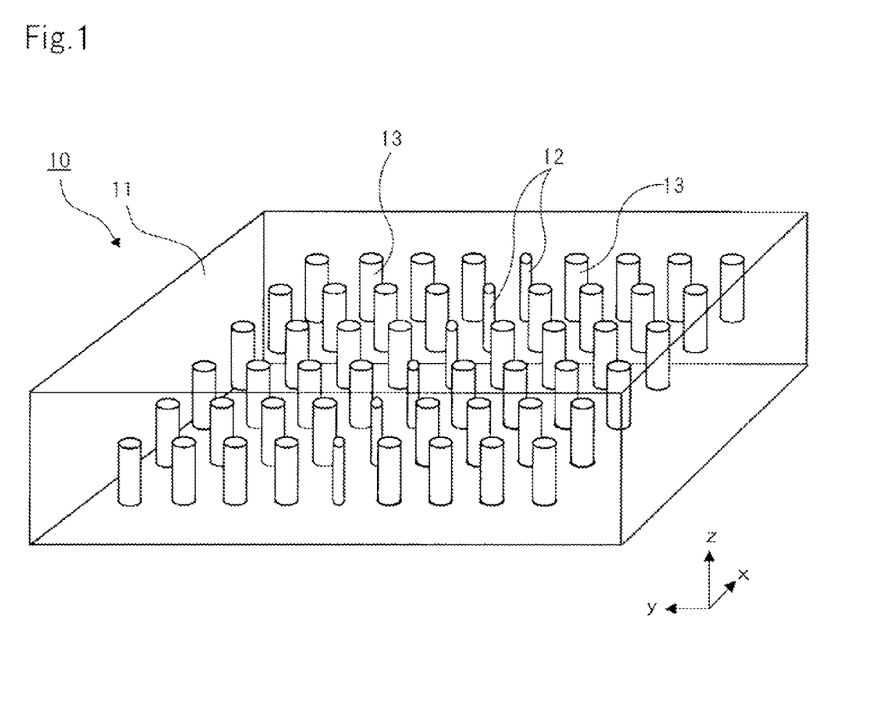
FIG. 1 is a schematic perspective view of the optical waveguide according to the first exemplary embodiment of the present invention.
Figure 2:
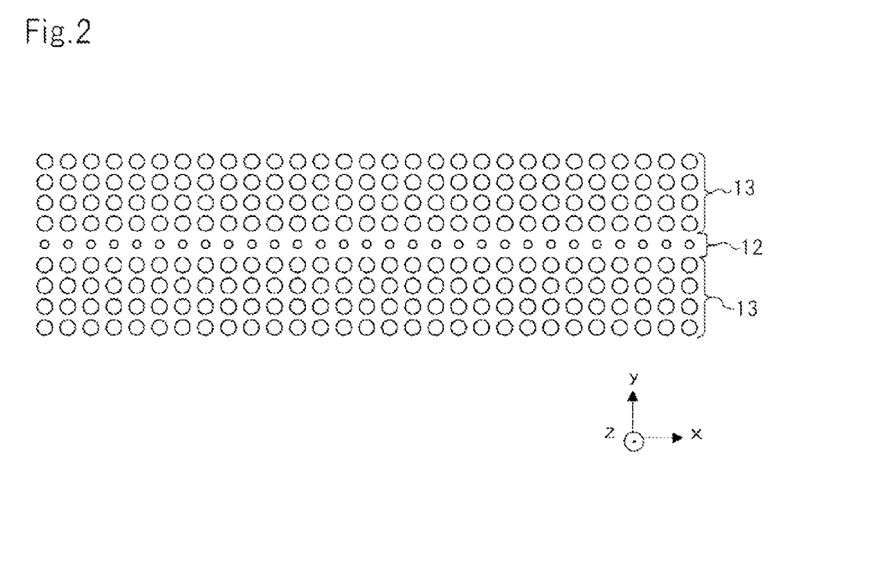
FIG. 2 is a schematic sectional view of the optical waveguide taken along plane x-y of FIG. 1.

FIG. 1 is a schematic perspective view of an optical waveguide according to the first exemplary embodiment of the present invention, and FIG. 2 is a schematic sectional view of the optical waveguide taken along plane x-y of FIG. 1. Optical waveguide 10 according to the present exemplary embodiment has first dielectric medium 11. Line-defect rods 12 arranged in one row and non-line-defect rods 13 arranged along the row of line-defect rods 12 and on both sides of the row of line-defect rods 12 are contained in first dielectric medium 11. In the present exemplary embodiment, line-defect rods 12 are a cylindrical material, and non-line-defect rods 13 are a cylindrical material different from line-defect rods 12.

Line-defect rods 12 and non-line-defect rods 13 form a two-dimensional square lattice in the x-y plane in the figure. Line-defect rods 12 have a diameter smaller than non-line-defect rods 13 and constitute a lattice defect of the two-dimensional square lattice. In other words, the cross-section of line-defect rods 12 in a cutting plane (a plane parallel to the x-y plane in FIG. 1) that cuts across line-defect rods 12 and non-line-defect rods 13 is smaller than the cross-section of non-line-defect rods 13 in the cutting plane.

In the present exemplary embodiment, four rows of non-line-defect rods 13 are, arranged on each of the two sides of the row of line-defect rods 12. The refractive index of line-defect rods 12 and non-line-defect rods 13 is greater than the refractive index of first dielectric medium 11.

As described hereinabove, optical waveguide 10 of the present exemplary embodiment is a photonic crystal having a refractive index distribution in a two-dimensional square lattice form and including a lattice defect arranged in a row. This optical waveguide 10 guides light of a specific frequency along the row of line-defect rods 12.

In addition, the number of line-defect rods 12 and non-line-defect rods 13 along the guiding direction of light (direction x in the figure) is determined according to the length of optical waveguide 10. First dielectric medium 11, line-defect rods 12, and non-line-defect rods 13 need not be crystal, and may be amorphous. First dielectric medium 11 is not limited to a solid and may be a gas such as air.

Optical waveguide 10 composed of a photonic crystal in which line-defect rods 12 and non-line-defect rods 13 are arranged in a square lattice form has the feature of low speed of light over a broad frequency band, i.e., low group velocity.

Typically, when an optical waveguide that guides light of a low group velocity is used, the length of the optical waveguide can be shortened even with optical circuits having the same function. As a result, higher integration of the optical circuit can be achieved.

Optical waveguide 10 according to the present exemplary embodiment has a mirror-symmetric refractive index distribution with respect to the plane in which the two-dimensional square lattice is formed by line-defect rods 12 and non-line-defect rods 13 (hereinbelow referred to as the "lattice plane"), i.e., with respect to the x-y plane in the figure.

The characteristics of a two-dimensional photonic crystal having a finite thickness (the width in the direction perpendicular to the lattice plane) do not completely match the characteristics of a virtual two-dimensional photonic crystal having infinite thickness. However, the optical characteristics of a photonic crystal of a finite thickness having a mirror-symmetric refractive index distribution are known to substantially match the optical characteristics of photonic crystal having infinite thickness at least in the frequency band in which light is guided.

The prediction of optical characteristics in a photonic crystal having infinite thickness is markedly easier than in a photonic crystal having a finite thickness. The prediction of optical characteristics as optical waveguide 10 (of photonic crystal) is therefore facilitated by making the refractive index distribution mirror-symmetric to the lattice plane, as in the present exemplary embodiment The dispersion relation of optical waveguide 10 according to the present exemplary embodiment is next described. "Dispersion relation" is the relation of the wave number and frequency of light, and represents the mode of an optical waveguide (of photonic crystal). For example, the dispersion relation can be calculated by a method such as a plane wave expansion method.

Figure 3:
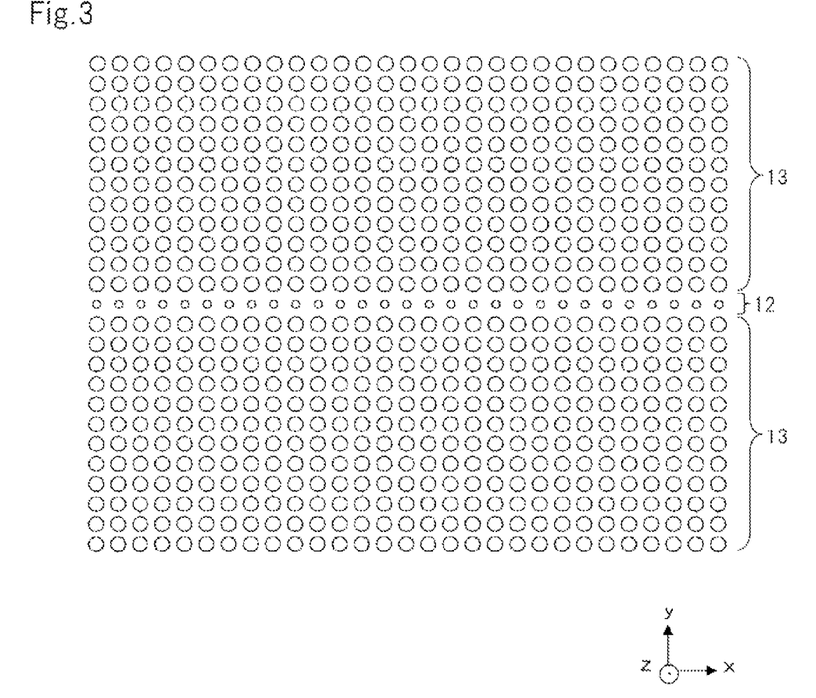
FIG. 3 is a schematic sectional view of the optical waveguide (related art) having a large number of rows of non-line-defect rods.

As a comparative example for comparison with optical waveguide 10 according to the present exemplary embodiment, the dispersion relation was calculated for an optical waveguide having a large number of rows of non-line-defect rods 13. FIG. 3 is a schematic sectional view of the optical waveguide of the comparative example. The optical waveguide of the comparative example has a first dielectric medium (not shown). In the first dielectric medium, line-defect rods 12 are formed arranged in one row and 12 rows of non-line-defect rods 13 are formed on each of the two sides of the row of line-defect rods 12.

In the present specification, the dispersion relation of the optical waveguide was calculated by a plane-wave expansion method. The calculation of the dispersion relation was carried out with the optical waveguides of the comparative example and the exemplary embodiment by approximating to an optical waveguide having infinite thickness. The dispersion relation of an optical waveguide having mirror symmetry with respect to the lattice plane is known to differ little from the dispersion relation of an optical waveguide having infinite thickness. Accordingly, with the object of comparing the features of the optical waveguide of the comparative example and the optical waveguide of the exemplary embodiment, the dispersion relations can be calculated with sufficient accuracy even when carrying out the above-described approximation.

When calculating the dispersion relation, the refractive index of first dielectric medium 11 was 1.44, and the refractive index of line-defect rods 12 and non-line-defect rods 13 was 3.48. Further, the diameter of non-line-defect rods 13 was 0.325a, the diameter of line-defect rods 12 was 0.2225a, and the height of non-line-defect rods 13 and line-defect rods 12 was 2.5a. Here, "a" is the lattice constant of a two-dimensional square lattice.

Figure 4:
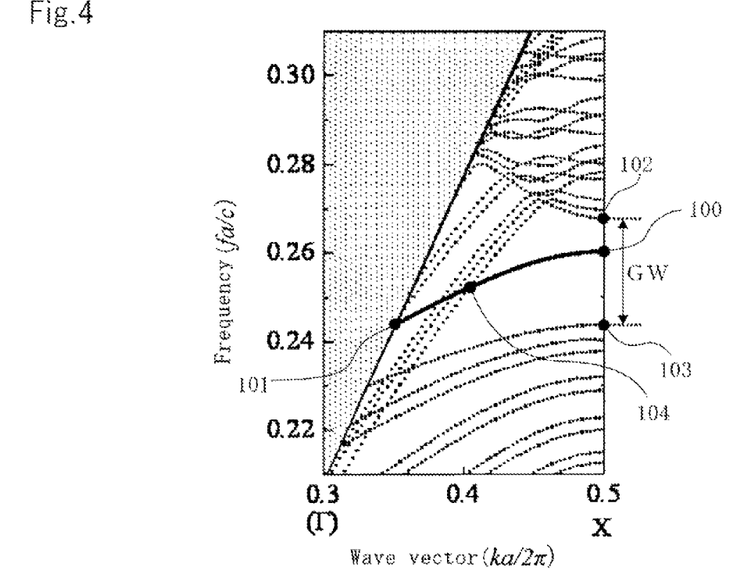
FIG. 4 is a graph showing the dispersion relation of the optical waveguide shown in FIG. 3.

FIG. 4 is a graph showing the dispersion relation in the optical waveguide of the comparative example. In the graph, the dispersion relation along the wave number on a line that leads to X point from $\Gamma$ (gamma) point (where the set of the frequency and the wave number is (0, 0)) is shown to clearly show the state of light that is guided in the x direction in FIG. 1.

The horizontal axis in the graph represents the value of "$ka/2\pi$" and the vertical axis represents the value of "$fa/c$." Here, "c" is the speed of light in a vacuum.

In the dispersion relation shown in FIG. 4, continuous region 40 shown in grey indicates the area in which optical confinement in the direction of thickness (the z direction in FIG. 1) does not occur. Light that corresponds to this continuous region 40 is radiated to the outside from within the optical waveguide. As a result, this light cannot be used as light that is guided in the optical waveguide.

The mode indicated by a solid line in the graph is the waveguide mode in which light is guided along line-defect rods 12. The plurality of curves indicated by dotted lines are bulk modes. In FIG. 4, the waveguide mode intersects three bulk modes.

In the case of an optical waveguide that has no imperfect structures, the waveguide mode and bulk mode exist independently and do not couple even at points of intersection of the waveguide mode and bulk mode. In other words, although lights that belong to each of the states have the same frequency and same wave number, the states are independent with differing electromagnetic field distribution. This existence of two or more different states having the same frequency, and moreover, having the same wave number is referred to as "degeneracy of states."

If the entire region of the waveguide mode is independent of the bulk mode, the light of the frequency band over the entire region of the waveguide mode can be used as light that is guided in the optical waveguide (guided light).

However, an optical waveguide manufactured in practice will have a somewhat imperfect structure. This imperfect structure results in coupling of waveguide mode and bulk mode in the vicinity of degenerated states. As a result, the waveguide mode and bulk mode cannot exist independently.

Light having frequency in the vicinity of coupled state leaks from the vicinity of line-defect rods 12 toward non-line-defect rods 13. Accordingly, light having frequency in the vicinity of the coupled state cannot be used in an actual optical waveguide.

In the case of FIG. 4, the band of light that can be used as waveguide light extends from upper limit 100 of the waveguide mode to state 104 at which the waveguide mode and bulk mode intersect. The frequency band of light that can be used as waveguide light is thus substantially reduced.

Figure 5:
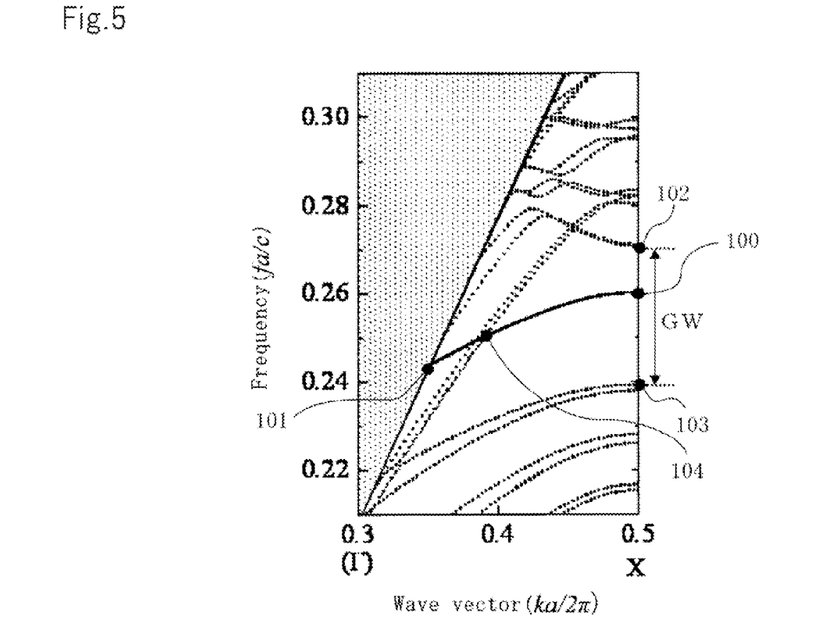
FIG. 5 is a graph showing the dispersion relation of the optical waveguide shown in FIG. 1.

The dispersion relation of optical waveguide 10 according to the present exemplary embodiment is next described with reference to the graph shown in FIG. 5. In the dispersion relation of optical waveguide 10 according to the present exemplary embodiment, the waveguide mode intersects with two bulk modes.

When compared with the dispersion relation of the comparative example shown in FIG. 4, state 104 at which the waveguide mode and bulk mode intersect is shifted toward a lower wave number, and toward a lower frequency. The main reason for this shift is that the bulk mode is shifted toward a higher frequency than the bulk mode in the comparative example.

The bulk mode is the mode in which light is propagated in non-line-defect rods 13. Accordingly, as a result of making the number of rows of non-line-defect rods 13 four rows, light of the bulk mode that is propagated in non-line-defect rods 13 is more prone to being influenced by the refractive index of the medium that is distributed further outside. As a result, the bulk mode of optical waveguide 10 according to the present exemplary embodiment is moved to a higher frequency.

Light that can be used as waveguide light in the present exemplary embodiment is the frequency band from upper limit 100 of the waveguide mode to state 104 at which waveguide light and bulk mode intersect. Because this frequency band is broadened, the frequency band of light that can be used as waveguide light is enlarged. In addition, state 104 at which waveguide mode and bulk mode intersect is distanced from the frequency of light that is used, whereby the transmittance of guided light is improved and noise is reduced. The characteristics and productivity of an optical integrated circuit that uses optical waveguide 10 are therefore improved.

In the dispersion relation according to the present exemplary embodiment, the gap width (GW) of the photonic band gap (PBG) is increased. Gap width GW is here defined as the width between upper limit 102 of the PBG and lower limit 103 of the PBG.

Upper limit 102 of the PBG in the present specification is defined as the state of the bulk mode located directly above the waveguide mode at X point. Lower limit 103 of the PBG is defined as the state of the bulk mode located directly below the waveguide mode at X point.

Gap width GW of the PBG in the waveguide of the present exemplary embodiment is larger than gap width GW in the waveguide of the comparative example. The inventors of the present invention have thus discovered that reducing the number of rows of non-line-defect rods 13 results in the enlargement of gap width GW.

Enlarging gap width GW can further broaden the frequency band of waveguide light that can be used. More specifically, the diameter of non-line-defect rods 13 of a cylindrical shape in optical waveguide 10 shown in FIG. 1 should be decreased from 0.325a to 0.2775a. The dispersion relation of the optical waveguide in this case is next described with reference to FIG. 6. In the dispersion relation shown in FIG. 6, the two bulk modes that intersect with the waveguide mode are shifted to higher frequencies than in the dispersion relation shown in FIG. 5.

Figure 6:
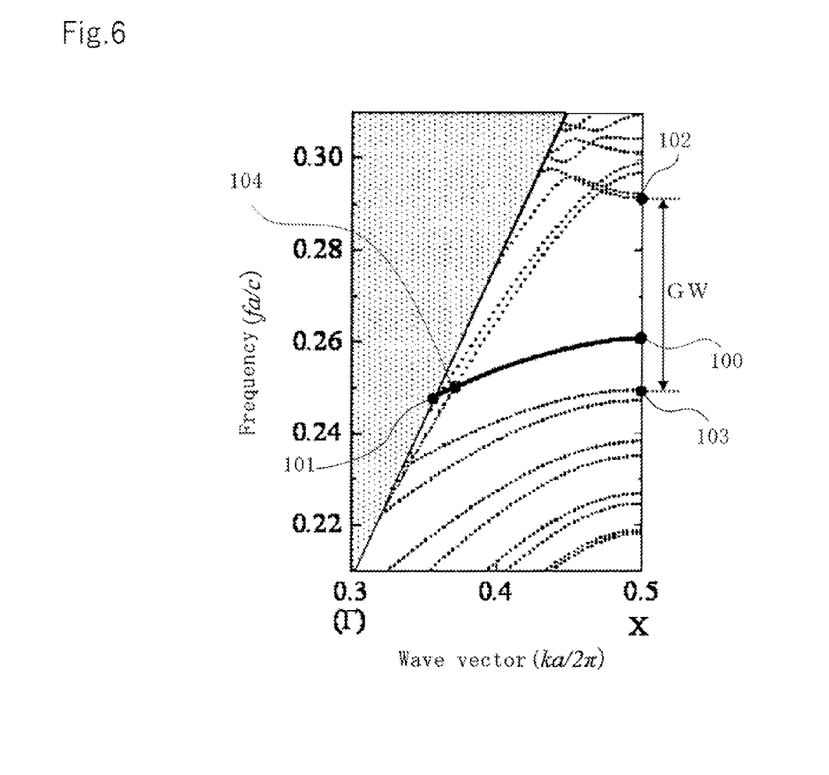
FIG. 6 is a graph showing the dispersion relation of an optical waveguide having non-line-defect rods that have a different diameter than the example of FIG. 5.

Taking advantage of this enlargement of gap width GW, state 104 at which the bulk mode and waveguide mode intersect can be positioned toward an end of the guiding mode band by adjusting the frequency band of the bulk mode. The frequency band of the bulk mode can be adjusted by changing the size or shape of non-line-defect rods 13.

As described hereinabove, state 104 at which the waveguide mode and bulk mode intersect is shifted toward lower frequency. Nearly the entire frequency band from upper limit 100 of the waveguide mode to lower limit 101 of the waveguide mode can thus be substantially used as guided light.

Still further, the inclination of the curve of the guiding mode decreases as lower limit 103 of the PBG approaches the guiding mode. The inclination of the curve of the guiding mode corresponds to the group velocity, i.e., the velocity of the waveguide light. Accordingly, decreasing the diameter of cylindrically shaped non-line-defect rods 13 enables a reduction of the group velocity of the guided light.

Optical waveguide 10 that has low group velocity features an optical delay effect and thus can be applied to, for example, phase modulators or optical switches.

In the above-described exemplary embodiment, a case was described in detail in which four rows of non-line-defect rods 13 were arranged along each of the two sides of line-defect rods 12 arranged in one row. However, the number of rows of non-line-defect rods 13 is not limited to four rows. The relation between the number of rows of non-line-defect rods 13 and the characteristics of an optical waveguide is next described.

Figure 7:
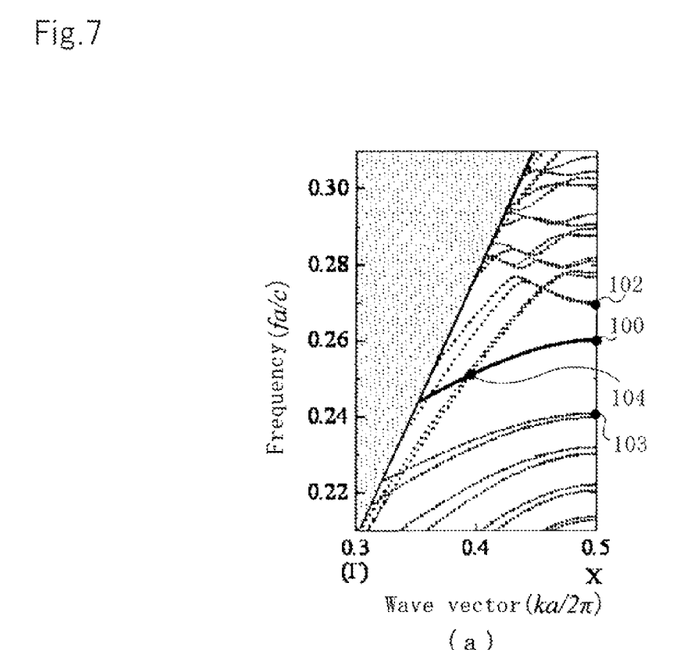
FIG. 7 is the dispersion relation of an optical waveguide having five rows of non-line-defect rods on each of the two sides of the line-defect rods.
Figure 8:
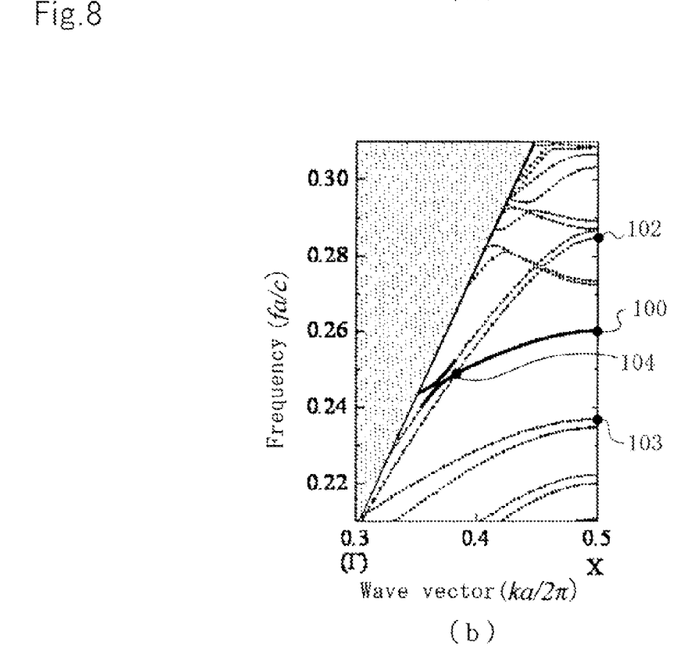
FIG. 8 is the dispersion relation of an optical waveguide having three rows of non-line-defect rods on each of the two sides of the line-defect rods.
Figure 9:
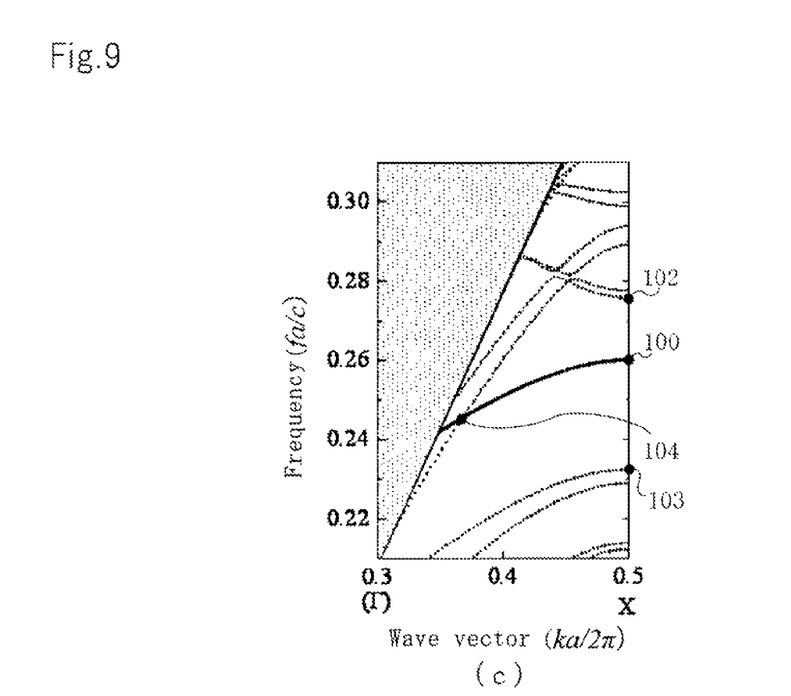
FIG. 9 is the dispersion relation of an optical waveguide having two rows of non-line-defect rods on each of the two sides of the line-defect rods.
Figure 10:
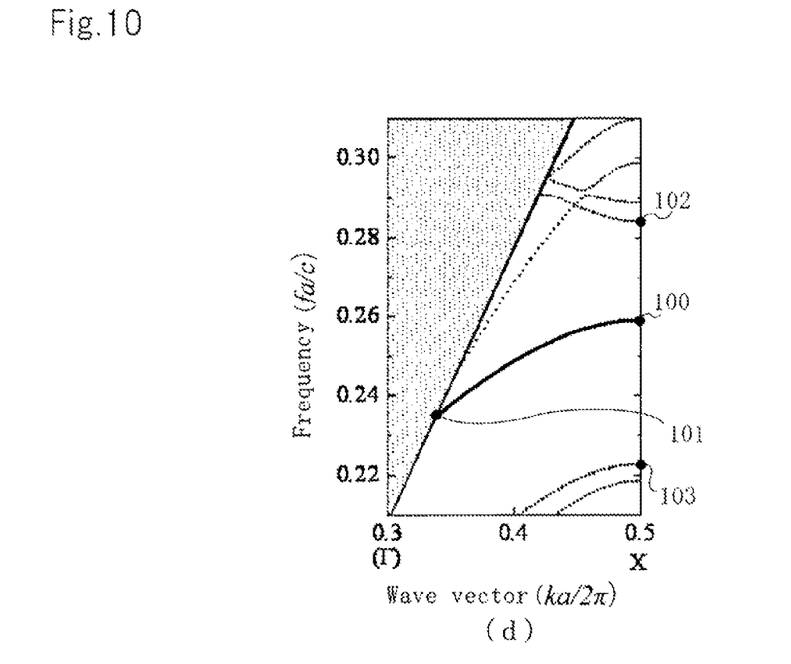
FIG. 10 is the dispersion relation of an optical waveguide having one row of non-line-defect rods on each of the two sides of the line-defect rods.

FIG. 7 is a graph showing the dispersion relation of optical waveguide 10 in a case in which five rows of non-line-defect rods 13 are provided on each of the two sides of line-defect rods 12 arranged in one row. FIG. 8 is a graph showing the dispersion relation when three rows each of non-line-defect rods 13 are provided. FIG. 9 is a graph showing the dispersion relation when two rows each of non-line-defect rods 13 are provided. FIG. 10 is a graph showing the dispersion relation when one row each of non-line-defect rods 13 is provided.

These graphs show the dispersion relation when the refractive index of first dielectric medium 11 is 1.44, the refractive index of line-defect rods 12 and non-line-defect rods 13 is 3.48, and further, the diameter of non-line-defect rods 13 is 0.325a, the diameter of line-defect rods 12 is 0.2225a, and the height of non-line-defect rods 13 and line-defect rods 12 is 2.5a.

In the graphs in the figures, the guiding mode is depicted by a solid line, and the bulk modes are depicted by dotted lines. Referring to the graphs, state 104 at which the guiding mode and bulk modes intersect shifts toward lower frequencies as the number of rows of non-line-defect rods 13 is decreased.

Accordingly, the frequency band from upper limit 100 of the guiding mode to state 104 broadens as the number of rows of non-line-defect rods 13 decreases. This trend is conspicuous when the number of rows of non-line-defect rods 13 is five or less. Accordingly, the number of rows of non-line-defect rods 13 arranged on both sides of the row of line-defect rods 12 is preferably at least one and no greater than five.

Figure 11:
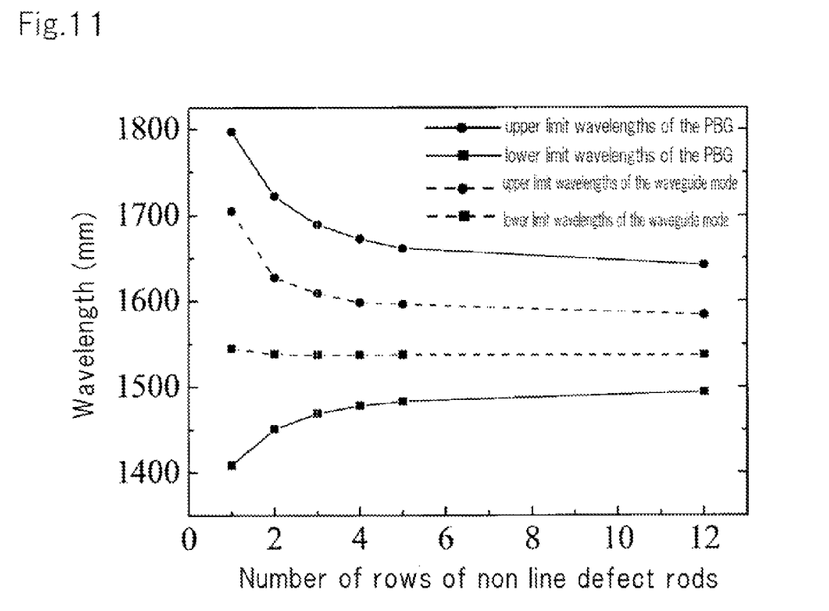
FIG. 11 is a graph showing the relation between the characteristics of an optical waveguide and the number of rows of non-line-defect rods.

FIG. 11 is a graph showing the relation between the number of rows of non-line-defect rods 13 and the upper limit and lower limit wavelengths of the PBG and the relation between the number of rows of non-line-defect rods 13 and the upper limit and lower limit wavelengths of the guiding mode.

The upper limit and lower limit wavelengths of the PBG are calculated from the frequencies that correspond to lower limit 103 and upper limit 102, respectively, of the PBG. In addition, the upper limit and lower limit wavelengths of the waveguide mode are calculated from the frequencies that correspond to lower limit 104 (or 101) and upper limit 100, respectively, of the guiding mode. When calculating these values, the value of lattice constant "a" was assumed to be 400 nm.

Referring to the graph shown in FIG. 11, as the number of rows of non-line-defect rods 13 is decreased, the wavelength band (gap width) of the PBG and the wavelength band of the guiding mode are broadened. The broadening of the wavelength band of the guiding mode results chiefly from the increase of the upper limit wavelength, i.e., the decrease of the lower limit frequency. This can be verified from the graphs shown in FIGS. 7 to 10.

In addition, even if the number of rows of non-line-defect rods 13 is decreased, the change in inclination of the guiding mode is small, and the characteristic of the guiding mode is almost unchanged. As a result, decreasing the number of rows of non-line-defect rods 13 can broaden the band of the guiding mode while causing almost no change to the characteristic of the guiding mode.

Second Exemplary Embodiment

Figure 12:
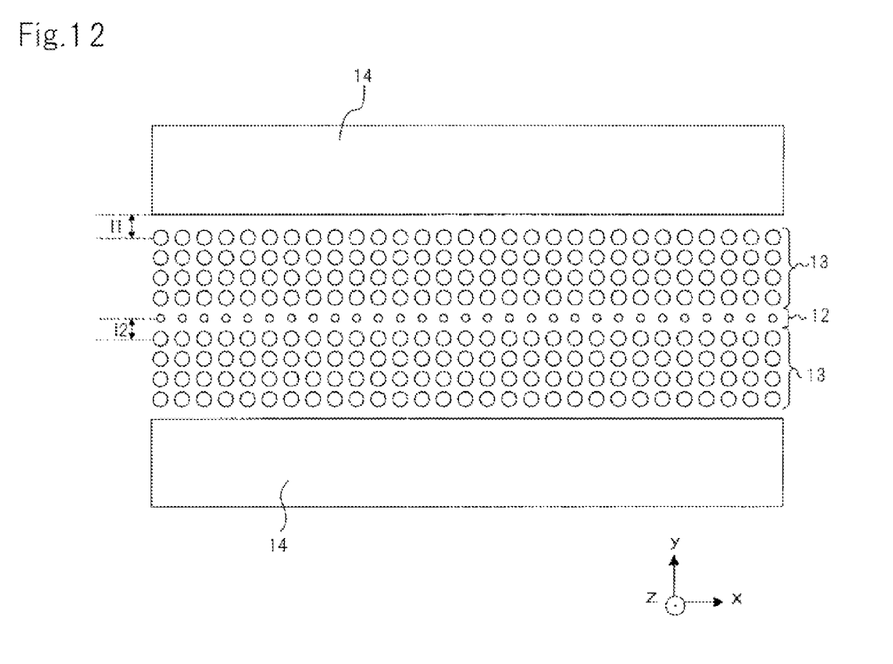
FIG. 12 is a schematic sectional view of the optical waveguide according to the second exemplary embodiment of the present invention.

The optical waveguide according to the second exemplary embodiment is next described. FIG. 12 is a schematic sectional view taken along the lattice plane of the optical waveguide according to the present exemplary embodiment.

Similar to the first exemplary embodiment, optical waveguide 10 according to the present exemplary embodiment has a first dielectric medium (not shown). The first dielectric medium contains line-defect rods 12 arranged in one row and rows of non-line-defect rods 13 arranged on both sides of the row of line-defect rods 12.

A two-dimensional square lattice is formed in the x-y plane in the figure by line-defect rods 12 and non-line-defect rods 13. The diameter of cylindrical line-defect rods 12 is smaller than the diameter of non-line-defect rods 13, thus forming a lattice defect of the two-dimensional square lattice. In other words, the cross-section of line-defect rods 12 in a cutting plane (a plane parallel to the x-y plane in FIG. 1) that cuts across line-defect rods 12 and non-line-defect rods 13 that form the two-dimensional square lattice is smaller than the cross-section of non-line-defect rods 13 in the cutting plane.

Four rows of non-line-defect rods 13 are arranged on each of the two sides of the row of line-defect rods 12. Line-defect rods 12 and non-line-defect rods 13 have a refractive index higher than first dielectric medium 11. The above-described configuration is the same as the first exemplary embodiment.

In the present exemplary embodiment, second dielectric medium 14 is arranged beyond the rows of non-line-defect rods 13 arranged on the two sides of the row of line-defect rods 12. Second dielectric medium 14 is provided in the first dielectric medium.

Second dielectric medium 14 preferably has a refractive index that is equal to or higher than the refractive index of first dielectric medium 11 or is an optical-absorption medium that absorbs light. To facilitate the manufacture of optical waveguide 10, the same material as non-line-defect rods 13 and line-defect rods 12 may be used as second dielectric medium 14.

As previously stated, when the guiding mode and bulk mode intersect (in the dispersion relation), the guiding mode and bulk mode couple due to imperfect structures. This coupling of states is particularly conspicuous when the bulk mode and the guiding mode intersect. Nevertheless, when imperfection of the structure is great, merely the existence of the guiding mode and bulk mode in the same frequency band results in coupling of the two states. Thus, in order to improve the transmittance of optical waveguide 10 and reduce noise, the bulk mode is desirable to be eliminated from the frequency band of the guiding mode.

In optical waveguide 10 according to the present exemplary embodiment, light of the bulk mode that is originally propagated through non-line-defect rods 13 contacts second dielectric medium 14, whereby the light of the bulk mode gradually leaks into second dielectric medium 14, resulting in a decrease of the light of the bulk mode that is propagated through non-line-defect rods 13. The mixing of bulk mode light and guided light is therefore suppressed, and the frequency band of light that can be used as waveguide light broadens.

When the refractive index of second dielectric medium 14 is lower than the refractive index of first dielectric medium 11, the total reflection resulting from the difference in refractive indices causes optical confinement of the bulk mode and prevents a drop in the light intensity of the bulk mode. Accordingly, second dielectric medium 14 preferably has a refractive index equal to or greater than the refractive index of first dielectric medium 11.

When an optical-absorption medium is used as second dielectric medium 14, light that leaks into the optical-absorption medium is absorbed regardless of the refractive index. In other words, the same effect can be obtained even when second dielectric medium 14 is an optical-absorption medium.

Light of the waveguide mode is restricted to the vicinity of line-defect rods 12 and therefore has almost no contact with second dielectric medium 14. As a result, light of the guiding mode experiences almost no attenuation. By attenuating only light of the bulk mode in this way, the transmittance of the waveguide light is improved, and noise is decreased.

The spacing between second dielectric medium 14 and non-line-defect rods 13 that are nearest to second dielectric medium 14 (spacing 11 in FIG. 12) is preferably no greater than twice the spacing between the row of line-defect rods 12 and the row of non-line-defect rods 13 that is nearest to the row of line-defect rods 12 (spacing 12 in FIG. 12).

When there is no second dielectric medium 14, the intensity of light of the bulk mode reduces exponentially with the distance from non-line-defect rods 13. Typically, the intensity of light drops to 10% or less at a position separated by twice the above-described spacing 12 from non-line-defect rods 13. As a result, light of the bulk mode can be effectively eliminated if spacing 11 is within twice the spacing 12.

Although spacing is provided between second dielectric medium 14 and non-line-defect rods 13 in FIG. 12, spacing need not be provided. A portion of non-line-defect rods 13 may be formed in second dielectric medium 14.

In the second exemplary embodiment as well, at least one but no more than five rows of non-line-defect rods 13 should be arranged on each of the two sides of the row of line-defect rods 12.

The method of fabricating optical waveguide 10 described hereinabove is next explained. Optical waveguide 10 can be produced by employing an SOI wafer (silicon on insulator wafer) as first dielectric medium 11. For the SOI wafer, the thickness of a buried oxide film is 2 μm and the thickness of a silicon active layer is 1 μm. The silicon active layer is undoped.

First, an electron-beam direct writing technique is used to form a resist pattern of circles in a two-dimensional lattice shape. When optical waveguide 10 is used for optical communication, the wavelength of the guided light should be 1.55 μm. In this case, the lattice constant is 0.4 μm, the diameter of the cylinders that are to become line-defect rods 12 is 0.178 μm, and the diameter of the cylinders that are to become non-line-defect rods 13 is 0.25 μm.

A silicon anisotropic dry-etching apparatus is next used to perform etching. More specifically, etching is carried out according to the resist pattern down to the surface of the lower-layer buried oxide film. Line-defect rods 12 and non-line-defect rods 13 can thus be formed in a two-dimensional lattice form.

The resist pattern is then removed by an organic solvent (such as acetone), following which an ultraviolet-curing resin having a refractive index of 1.44 which is identical to the buried oxide film is applied and cured by ultraviolet rays.

Optical waveguide 10 can be produced as described above. Alternatively, an oxide film can be used as line-defect rods 12 and non-line-defect rods 13 in place of an ultraviolet-curing resin.

Third Exemplary Embodiment

In the above-described exemplary embodiments, the number of rows of non-line-defect rods 13 that are arranged on one side of the row of line-defect rods 12 was the same as the number of rows of non-line-defect rods 13 arranged on the other side of the row of line-defect rods 12. However, in optical waveguide 10 of the present exemplary embodiment, of the rows of non-line-defect rods 13 arranged on each of the two sides of the row of line-defect rods 12, the number of rows of non-line-defect rods 13 should be at least one and no more than five on at least one side.

Figure 13:
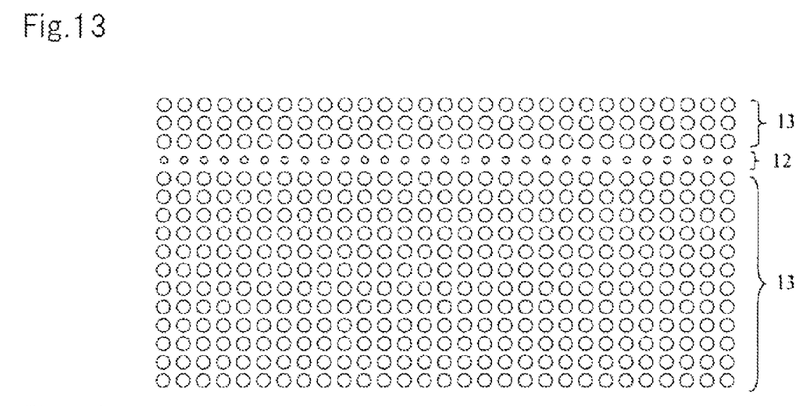
FIG. 13 is a schematic sectional view of the optical waveguide according to the third exemplary embodiment of the present invention.

FIG. 13 is a schematic sectional view of the optical waveguide according to the third exemplary embodiment. The optical waveguide of the present exemplary embodiment has a configuration substantially identical to that of the first exemplary embodiment. Rows of non-line-defect rods 13 are provided on each of the two sides of line-defect rods 12 arranged in one row. However, the number of rows of non-line-defect rods 13 on one side is no more than five, and the number of rows of non-line-defect rods 13 on the other side is six or more.

When there are fewer rows of non-line-defect rods 13 formed on one side of the row of line-defect rods 12, the light of the bulk mode that is propagated along the non-line-defect rods 13 is more prone to the influence of the medium that is beyond non-line-defect rods 13.

Accordingly, by making the number of rows of non-line-defect rods 13 five or less on at least one side, light of the bulk mode shifts toward a frequency higher than in a case having a greater number of rows of non-line-defect rods 13.

Thus, as with the first exemplary embodiment, state 104, at which the bulk mode and guiding mode intersect, is shifted toward lower frequencies and the frequency band of waveguide light that can be used is broadened.

In the present exemplary embodiment, as in the second exemplary embodiment, a second dielectric medium may be formed further outside than non-line-defect rods 13.

Fourth Exemplary Embodiment

In the above-described exemplary embodiments, detailed explanation regarded a photonic crystal in which a two-dimensional square lattice is formed by line-defect rods and non-line-defect rods, but the lattice shape is not limited to a square lattice.

Figure 14:
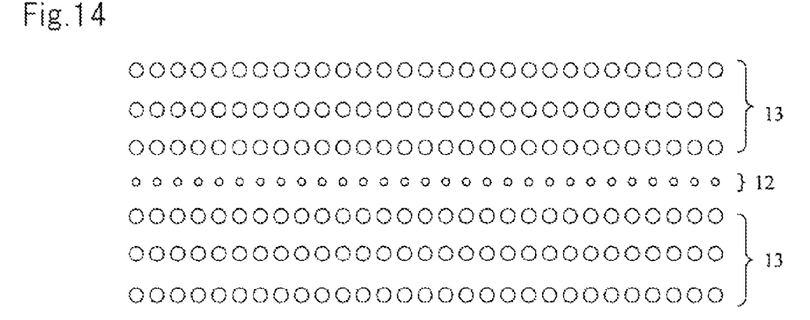
FIG. 14 is a schematic sectional view of the optical waveguide according to the fourth exemplary embodiment of the present invention.
Figure 15:
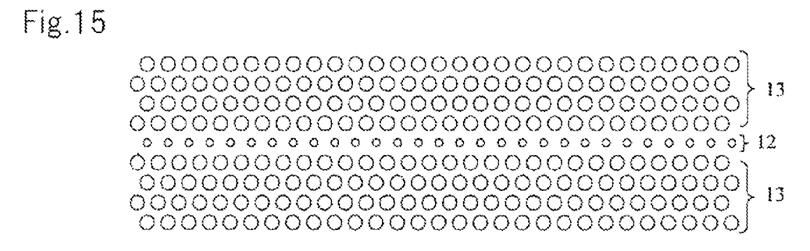
FIG. 15 is a schematic sectional view of the optical waveguide according to a modification of the fourth exemplary embodiment of the present invention

FIG. 14 is a schematic sectional view of an optical waveguide having a rectangular lattice (a lattice in which a unit cell is rectangular) refractive index structure, and FIG. 15 is a schematic sectional view of an optical waveguide having a triangular lattice refractive index structure.

More specifically, the optical waveguide includes: first dielectric medium (not shown), line-defect rods 12, and rows of non-line-defect rods 13 arranged along the row of line-defect rods. 12 on both sides of the row of line-defect rods 12. In the optical waveguide shown in FIG. 14, a rectangular lattice is formed by line-defect rods 12 and non-line-defect rods 13. In the optical waveguide shown in FIG. 15, a triangular lattice is formed by line-defect rods 12 and non-line-defect rods 13.

In this case as well, of the rows of non-line-defect rods 13 that are arranged on both sides of the row of line-defect rods 12, the number of rows of non-line-defect rods 13 on at least one side should be at least one and no greater than five.

The present invention is not limited to the above-described exemplary embodiments and is open to various modifications and amendments. For example, in the above-described exemplary embodiments, the diameter of cylindrical line-defect rods 12 is smaller than the diameter of cylindrical non-line-defect rods 13. However, line-defect rods 12 may take any form as long as they have a difference from non-line-defect rods 13 that can produce a lattice defect of a two-dimensional lattice.

Examples of this difference that can be offered include one of a difference in size, a difference in shape, and a difference in refractive index, or can be a plurality of combinations of these differences.

Although preferable exemplary embodiments of the present invention have been proposed and described in detail, it is to be understood that the present invention is open to various modifications and amendments that do not depart from the scope or gist of the appended claims.

What is claimed is:

1. An optical waveguide comprising:
    a first dielectric medium;
    line-defect rods arranged in one row in said first dielectric medium; and rows of non-line-defect rods arranged along the row of the line-defect rods on both sides of the row of the line-defect rods; wherein:
    a two-dimensional lattice is formed by said line-defect rods and said non-line-defect rods;
    of the rows of said non-line-defect rods arranged on both sides of the row of the line-defect rods, the number of rows of said non-line-defect rods on at least one side is at least one but no more than five;
    a second dielectric medium is provided beyond the rows of said non-line-defect rods that are arranged on both sides of the row of the line-defect rods;
    the spacing between said second dielectric medium and said non-line-defect rods in greatest adjacency to said second dielectric medium is not greater than twice the spacing between the row of said line-defect rods and the row of said non-line-defect rods that is nearest to the row of said line-defect rods; and
    the refractive index of said second dielectric medium is equal to or greater than the refractive index of said first dielectric medium.

2. The optical waveguide as set forth in claim 1, wherein the refractive index of said line-defect rods and the refractive index of said non-line-defect rods are greater than the refractive index of said first dielectric medium.

3. The optical waveguide as set forth in claim 1, wherein the number of rows of said non-line-defect rods arranged on one side of said line-defect rods is the same as the number of rows of said non-line-defect rods arranged on the other side of said line-defect rods.

4. The optical waveguide as set forth in claim 1, wherein the cross-section of said line-defect rods in a cutting plane that cuts across said line-defect rods and said non-line-defect rods that form said two-dimensional lattice is smaller than the cross-section of said non-line-defect rods in said cutting plane.

5. The optical waveguide as set forth in claim 1, wherein said two-dimensional lattice is a square lattice.

6. The optical waveguide as set forth in claim 1, wherein said two-dimensional lattice is a rectangular lattice.

7. The optical waveguide as set forth in claim 1, wherein said two-dimensional lattice is a triangular lattice.

8. An optical waveguide comprising:
a first dielectric medium;
line-defect rods arranged in one row in said first dielectric medium; and rows of non-line-defect rods arranged along the row of the line-defect rods on both sides of the row of the line-defect rods; wherein:
a two-dimensional lattice is formed by said line-defect rods and said non-line-defect rods;
of the rows of said non-line-defect rods arranged on both sides of the row of the line-defect rods, the number of rows of said non-line-defect rods on at least one side is at least one but no more than five;
a second dielectric medium is provided beyond the rows of said non-line-defect rods that are arranged on both sides of the row of the line-defect rods;
the spacing between said second dielectric medium and said non-line-defect rods in greatest adjacency to said second dielectric medium is not greater than twice the spacing between the row of said line-defect rods and the row of said non-line-defect rods that is nearest to the row of said line-defect rods; and
said second dielectric medium is an optical absorption medium that absorbs light.

9. The optical waveguide as set forth in claim 8, wherein the refractive index of said line-defect rods and the refractive index of said non-line-defect rods are greater than the refractive index of said first dielectric medium.

10. The optical waveguide as set forth in claim 8, wherein the number of rows of said non-line-defect rods arranged on one side of said line-defect rods is the same as the number of rows of said non-line-defect rods arranged on the other side of said line-defect rods.

11. The optical waveguide as set forth in claim 8, wherein the cross-section of said line-defect rods in a cutting plane that cuts across said line-defect rods and said non-line-defect rods that form said two-dimensional lattice is smaller than the cross-section of said non-line-defect rods in said cutting plane.

12. The optical waveguide as set forth in claim 8, wherein said two-dimensional lattice is a square lattice.

13. The optical waveguide as set forth in claim 8, wherein said two-dimensional lattice is a rectangular lattice.

14. The optical waveguide as set forth in claim 8, wherein said two-dimensional lattice is a triangular lattice.

\* \* \* \* \*